J. GREENE.

BOX FOR CASE-HARDENING.

No. 7,533. Reissued Feb. 27, 1877.

Witnesses
Philip F. Larner
Edwin James.

Inventor
James Greene,
By Wm. C. Wood
Attorney.

N. PETERS, PHOTO-LITHOGRAPHER, WASHINGTON, D. C.

UNITED STATES PATENT OFFICE

JAMES GREENE, OF PROVIDENCE, RHODE ISLAND.

IMPROVEMENT IN BOXES FOR CASE-HARDENING.

Specification forming part of Letters Patent No. 40,477, dated November 3, 1863; reissue No. 7,533, dated February 27, 1877; application filed November 8, 1876.

*To all whom it may concern:*

Be it known that I, JAMES GREENE, of Providence, in the county of Providence and State of Rhode Island, have invented a new and Improved Box for Case-Hardening; and I do hereby declare that the following is a full, clear, and exact description of the same, reference being had to the accompanying drawings, making a part of this specification, in which—

Figure 1:
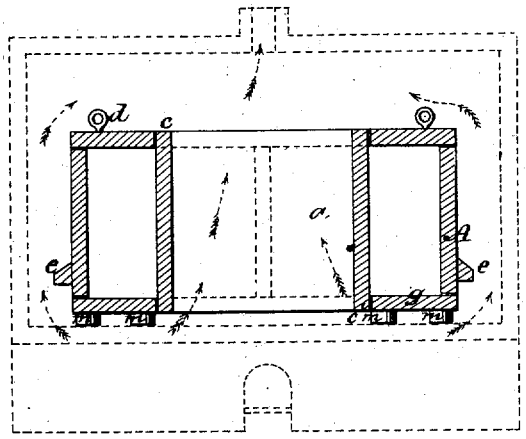
Figure 2:
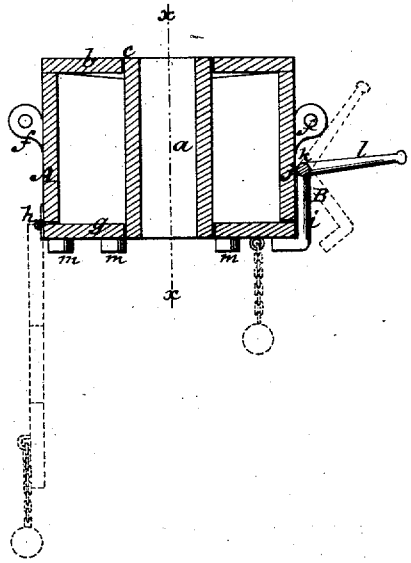
Figure 3:
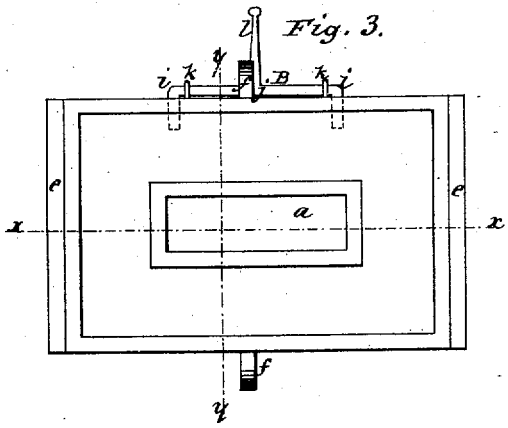

Figure 1 is a vertical section of my invention, taken in the line *x x*, Fig. 3. Fig. 2 is a vertical section of the same, taken in the line *y y*, Fig. 3; Fig. 3, a plan or top view of the same, with the lid or top removed.

Similar letters of reference indicate corresponding parts in the several figures.

The object of this invention is to obtain a box for case-hardening which will admit of the articles to be operated upon being heated in a more uniform manner than hitherto, and after being subjected a requisite time to the heat in contact with the bone-dust or other material used, and then admit of the articles being suddenly and properly precipitated from the box into the water or other liquid which tempers them.

The ordinary way of case-hardening consists in placing the articles to be operated upon in a metal box containing certain animal matters, such as the hoofs, horns, bones, and skin in a charred or coarsely-pounded state, the articles being surrounded on all sides with a layer from one-half to one inch thick. The box is then heated a certain length of time, and the articles are then turned out of the box into the water or other tempering-liquid by inverting the latter. The difficulties attending this operation are twofold, to wit: The articles at the center of the box are not subjected to so great a heat as those near its sides, for the reason that the exterior only of the box is in contact with the heat, and in inverting the box, in order to discharge its contents, the latter descends into the water or other tempering-liquid with a rotary motion, which frequently warps the articles.

My invention fully obviates these difficulties; and it consists, first, in constructing the box with a central opening or flue extending entirely through it, and having the bottom of the box provided with supports or legs, so that it will be elevated a short distance above the bottom of the oven or shelf which supports it, and admit of the heat passing up through the central flue, so as to heat the box at its center, thereby causing the articles within it to be evenly or uniformly heated.

My invention consists, secondly, in providing the box with a hinged or sliding bottom, arranged in such a manner that the contents of the box, by withdrawing the bottom, may be suddenly discharged into the tempering-liquid, and without communicating to them a rotary motion.

To enable those skilled in the art to fully understand and construct my invention, I will proceed to describe it.

A represents a box, which may be constructed of cast or wrought metal, and of rectangular or other proper shape. The box is formed with a central opening or flue, *a*, extending entirely through it, the lid *b* having a similar opening, *c*, so that when it is adjusted to the box it may fit snugly around the top of *a*. The lid *b* is secured to the box A by bolts *d*, arranged in any proper way. The ends of the box are provided with lugs or cleats *e*, the use of which will be presently stated, and the sides of the box are provided with ears *f*, for the convenience of grasping it by a proper implement when placed into and removed from the oven. These ears *f* may be either at the sides or ends of the box, as desired. The bottom *g* of the box is provided with an opening, *c'*, like that of the lid, and is attached to the latter by hinges or joints *h*, and the box at the side opposite to that where the hinges are attached has a catch, B, secured to it. This catch B may be arranged in various ways. The one shown in the drawings, Figs. 2 and 3, consists of two hooks, *i i*, at the ends of a shaft, *j*, which is fitted in bearings *k k* attached to the side of the box, and allowed to turn freely therein. This sh aft *j* has ahandle, *l*, attached to it. The hooks *i i*, when the bottom *g* is closed in contact with the box, catch under the bottom *g*, and hold it snugly to the box, as shown clearly in Fig. 2, and by turning the shaft *j*, through the medium of the handle *l*, the hooks *i i* may be freed from the bottom *g*, and the latter allowed to drop, as indicated by the dotted outline in Fig. 2. This bottom may have a weight attached to it, as shown in dotted lines, in order to aid its sudden dropping. This bottom *g* has feet or legs *m* attached to it, as shown in Figs. 1 and 2.

By this construction it will be seen that when the box is placed in the oven (shown in dotted outline in Fig. 1) the heat will be allowed to pass through the central opening or flue *a*, as well as around the sides and over the top or lid *b* of the box, and the contents of the box will therefore be evenly or uniformly heated—a great advantage in case-hardening, as it insures a hardness of uniform depth all over the articles under operation.

When the contents of the box have been subjected to heat a requisite length of time, it is removed from the oven by grasping the ears *f* with a proper tool, and placed over a cask containing the water or tempering-fluid, the lugs or cleats *e e* resting on bars to support the box. The catch B is then actuated, and the bottom *g* of the box thereby released, the bottom instantly dropping and discharging the contents of the box into the cask, the articles to be hardened being let bodily down without any turning movement, thereby insuring the hardening of the articles without the same being warped or twisted—a contingency which is liable to occur when the articles are turned out of the box by inverting the same.

By means of the hinged bottom the articles are also very suddenly precipitated into the tempering-fluid, much more so than when turned out of the box, and the articles are consequently not so liable to be oxidized by contact with the air. This is not an unimportant feature of the invention.

I would remark that I do not confine myself to the hinged bottom *g*, for a sliding one might be used, although it would be inferior to the hinged one. Still it would be a great improvement over the old box.

Having thus described my invention, what I claim as new, and desire to secure by Letters Patent, is—

1. A box for case-hardening, provided with a central opening or flue, and a movable discharging-bottom, substantially as described.

2. A box for case-hardening, provided with a bottom, which is connected with the walls of the box, and is also movable, substantially as described.

3. A box for case-hardening, provided with a central flue, and with supports or legs, substantially as described, for securing a circulation beneath the box and upward through the central flue, as set forth.

JAMES GREENE.

Witnesses:

PHILIP F. LARNER,
A. B. CAULDWELL.